US008873867B1

(12) United States Patent
Alldrin et al.

(10) Patent No.: US 8,873,867 B1
(45) Date of Patent: Oct. 28, 2014

(54) ASSIGNING LABELS TO IMAGES

(75) Inventors: Neil G. Alldrin, San Jose, CA (US);
Thomas J. Duerig, Sunnyvale, CA (US);
Zhen Hao Zhou, Union City, CA (US);
Maks Ovsjanikovs, Menlo Park, CA (US); Charles J. Rosenberg, Cupertino, CA (US); Samy Bengio, Los Altos, CA (US); Maya Gupta, Seattle, WA (US)

(73) Assignee: Google Inc., Mountain View, CA (US)

( * ) Notice: Subject to any disclaimer, the term of this patent is extended or adjusted under 35 U.S.C. 154(b) by 119 days.

(21) Appl. No.: 13/545,373

(22) Filed: Jul. 10, 2012

(51) Int. Cl.
*G06K 9/62* (2006.01)
*G06F 7/00* (2006.01)
*G06F 17/30* (2006.01)

(52) U.S. Cl.
USPC .......................... 382/224; 707/765; 707/777

(58) Field of Classification Search
None
See application file for complete search history.

(56) References Cited

U.S. PATENT DOCUMENTS

2004/0225686 A1* 11/2004 Li et al. ...................... 707/104.1
2012/0269436 A1* 10/2012 Mensink et al. ............. 382/180
2013/0259390 A1* 10/2013 Dunlop et al. ............... 382/224

OTHER PUBLICATIONS

Ballan et al, Tag Suggestion and Localization in User-generated Videos based on Social Knowledge, 2010, WSM'10, Oct. 25, 2010, Firenze, Italy, pp. 3-7.*
Hsu et al, Combining WordNet and ConceptNet for Automatic Query Expansion: A Learning Approach, 2008, AIRS 2008, LNCS 4993, pp. 213-224.*
Xie et al., "The Accuracy and Value of Machine-Generated Image Tags Design and User Evaluation of an End-to-End Image Tagging System", pp. 58-65, CIVR '10, Jul. 5-7, Xi'an China.

* cited by examiner

*Primary Examiner* — Bhavesh Mehta
*Assistant Examiner* — David F Dunphy
(74) *Attorney, Agent, or Firm* — Fish & Richardson P.C.

(57) ABSTRACT

Methods, systems and apparatus for assigning labels to images. In general, in one aspect, a method includes determining, for an image, a first set of labels, each label being determined to be indicative of subject matter of the image based on content feature values of the image, for each label in the first set of labels, determining a second set of labels, each label in the second set of labels determined to be semantically related to the label in the first set of labels, assigning a score to each label in the second sets of labels, and based on the scores assigned to each label in the second sets of labels, assigning one or more of the labels in the second sets of labels to the image.

16 Claims, 7 Drawing Sheets

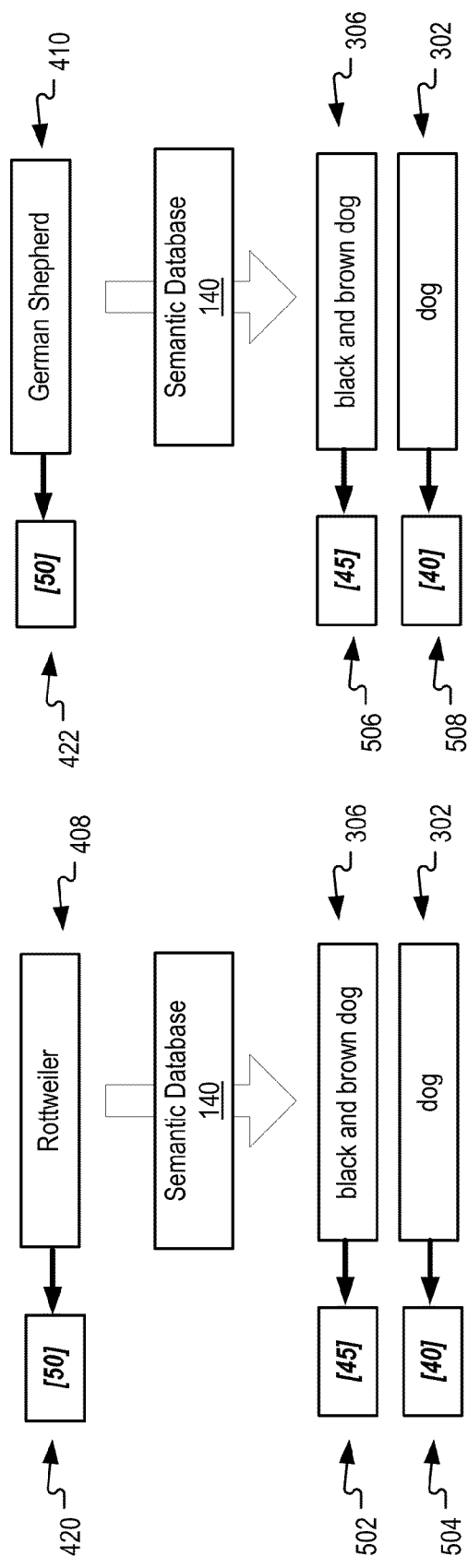
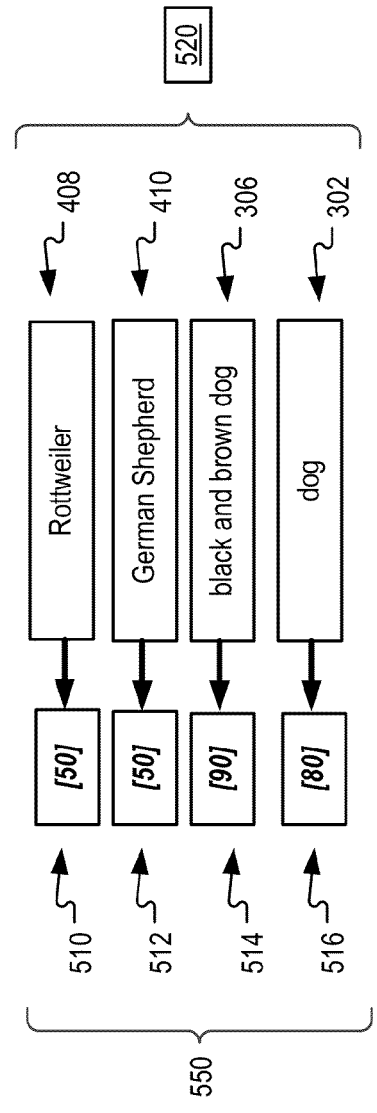
FIG. 5A
FIG. 5B
FIG. 5C

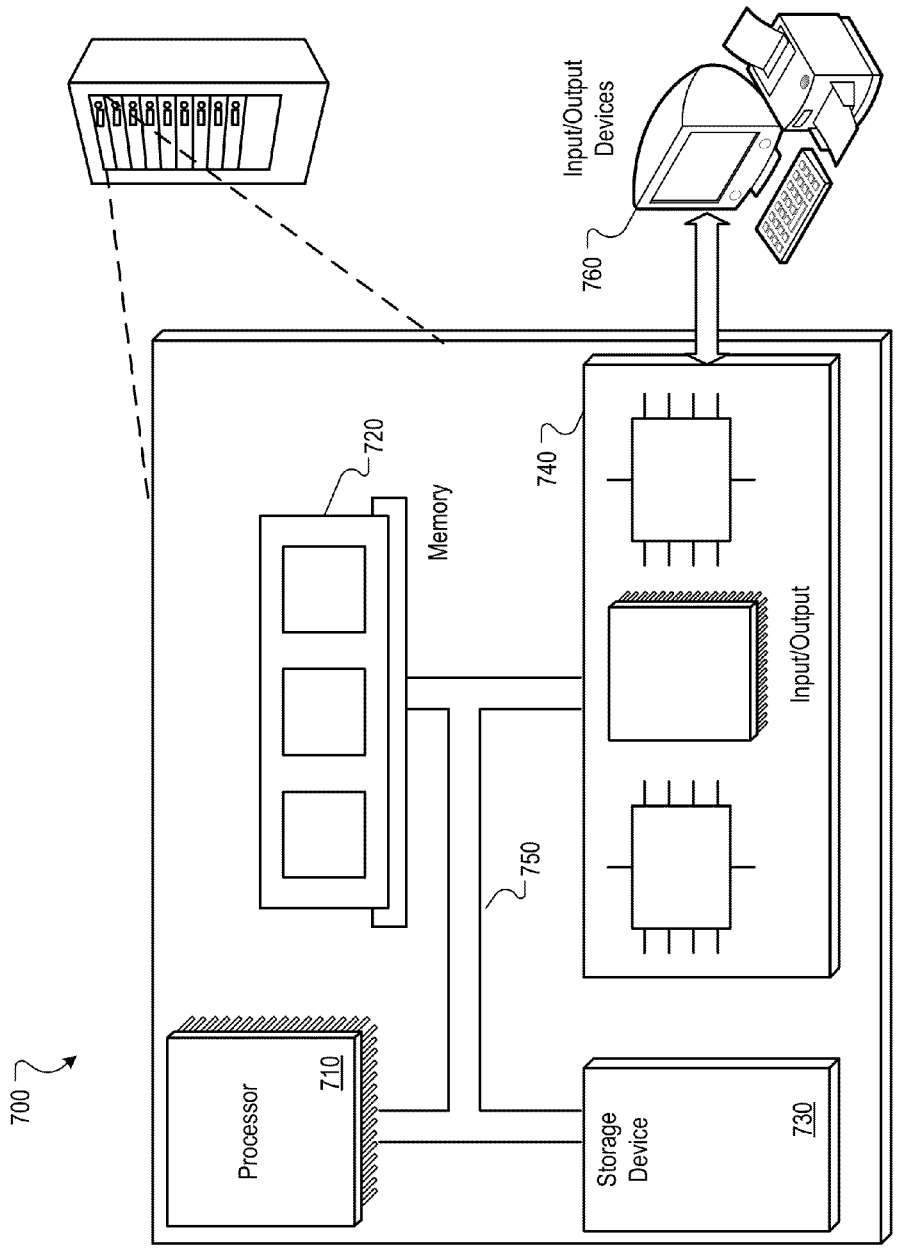

ASSIGNING LABELS TO IMAGES

BACKGROUND

This specification relates to data processing and assigning labels to images.

An image search apparatus can use an image relevance model to evaluate relevance between textual user queries and images. For example, the relevance of an image to a user query can be determined, in part, based on textual content depicted in the image or textual content associated with the image, e.g., textual content appearing on a web page in association with the image. Further, the image relevance model can be used to identify visual features of multiple images that have been identified as relevant to the same query. Multiple images that have been identified as relevant to the same query may have similar visual features, such as similar colors, brightness, shapes, edge locations, and/or other similar attributes. For example, images associated with the query "sunrise" will likely share similar colors (of a sky at sunrise) and shapes (of a sun appearing on the horizon). The attributes identified by the image relevance model can be used to further identify other images sharing the same common features that may also be relevant to a query.

SUMMARY

In general, in one aspect, a method includes determining, for an image, a first set of labels, each label being determined to be indicative of subject matter of the image based on content feature values of the image, for each label in the first set of labels, determining a second set of labels, each label in the second set of labels determined to be semantically related to the label in the first set of labels, assigning a score to each label in the second sets of labels, and based on the scores assigned to each label in the second sets of labels, assigning one or more of the labels in the second sets of labels to the image. This and other implementations of this aspect include corresponding systems, apparatus, and computer program products.

Implementations of this aspect may include one or more of the following features. Assigning one or more of the labels in the second sets of labels to the image comprises assigning labels in the second sets of labels having a score meeting a score threshold to the image. Assigning a score to each label in the second sets of labels comprises receiving a confidence score indicating a confidence that the respective label in the second sets of labels is semantically related to the respective label in the first set of labels, and assigning the score to the respective label based on the confidence score. Assigning a score to each label in the second sets of labels comprises receiving a relevance score indicating a degree to which a label in the first set of labels is semantically related to the image, and assigning the score to the respective label based on the relevance score. Assigning a score to each label in the second sets of labels received for each label in the set of labels comprises receiving a popularity score indicating a popularity of the respective label in the second sets of labels when the respective label in the second sets of labels is used by users to tag images in a database of images. The method includes providing the image to one or more image relevance models that generate relevance measures for content feature values of images to a respective query, the image relevance models trained based on content feature values of a set of training images, the queries each being a unique set of one or more query terms received by a search system as a query input, wherein the first set of labels is determined based on the relevance measures generated by the image relevance model for the image. The method includes for each of the one or more of the labels in the second sets of labels, accessing an image relevance model that generates relevance measures of content feature values of images to a query matching the respective label, the image relevance models trained based on content feature values of a set of training images, the query being a unique set of one or more query terms received by a search system as a query input, providing the image to an image relevance model, receiving an image relevance score from the image relevance model for the image, determining that the image relevance score meets an image relevance score threshold, and based on the determination, assigning the respective label to the image. Each label in the second set of labels is determined to be semantically related to the label in the first set of labels based on a graph of semantic relationships between labels. Assigning one or more of the labels in the second sets of labels to the image comprises assigning a threshold number of labels in the second sets of labels having scores higher than other labels in the second sets of labels.

Particular implementations of the subject matter described in this specification can be implemented so as to realize one or more of the following advantages. When labels are identified without context or are overly broad or overly narrow, better image labels can be selected.

The details of one or more implementations are set forth in the accompanying drawings and the description below. Other features, aspects, and advantages will be apparent from the description and drawings, and from the claims.

DESCRIPTION OF DRAWINGS

FIGS. 5A-5C are block diagrams showing an example data flow for generating label scores.

FIG. 7 is a block diagram of an example computer system.

Like reference symbols in the various drawings indicate like elements.

DETAILED DESCRIPTION

Overview

Figure 1:
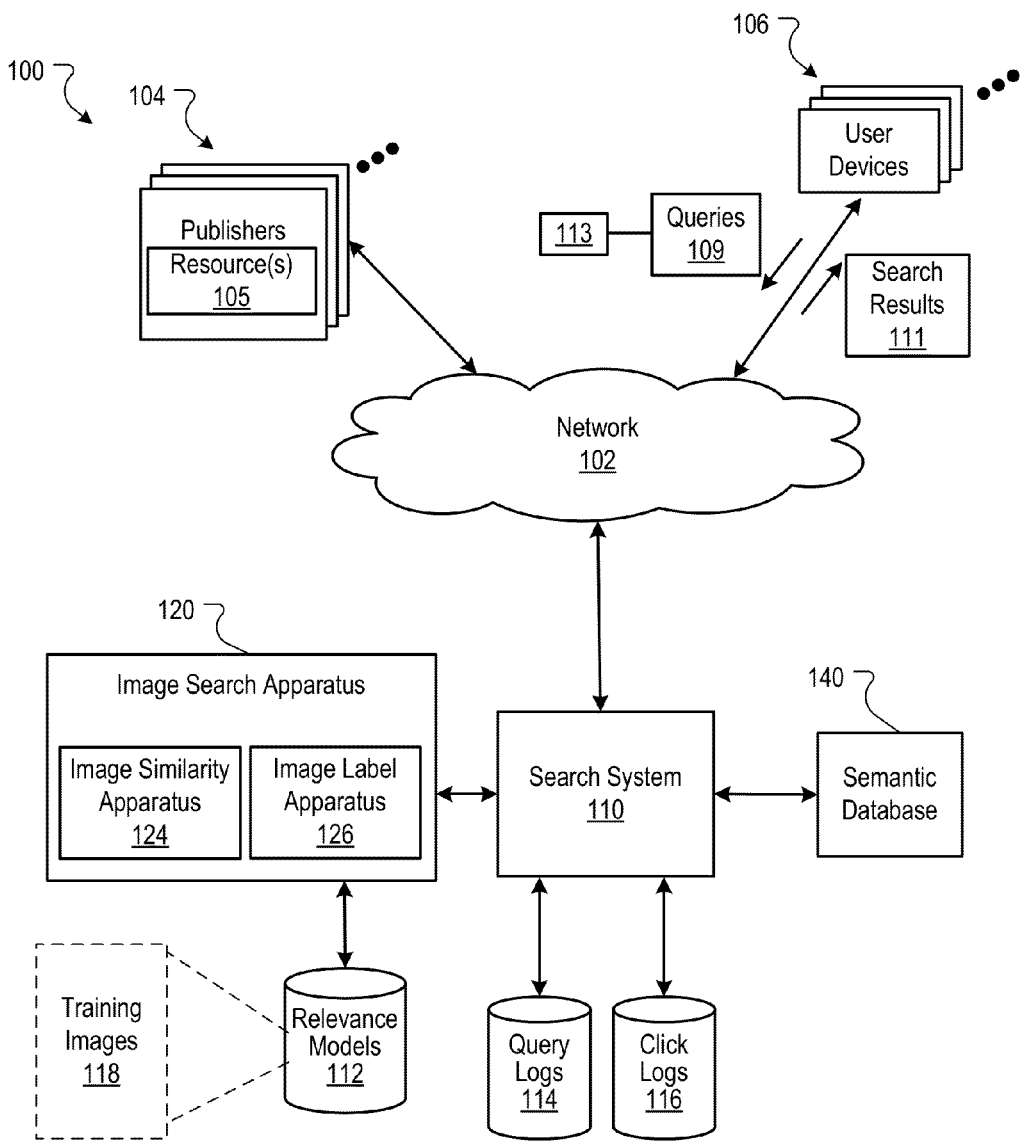
FIG. 1 is a block diagram of an example environment in which a search system provides search services.

An image annotator determines text labels for an image based on the content of the image. The image annotator consults image relevance models to make the determination. The image annotator may return several text labels for a single image, and many of the text labels may be semantically related. For example, the image annotator may return "dog," "black dog," "black and brown dog," "large dog," "animal," "German Shepherd," and "Rottweiler," all for the same image.

Sometimes, some of the labels are too general, and some of the labels are too specific. For example, if the image is a picture of a dog, then the text label "animal" may be too broad to use in an image search operation because the label can apply to many images of other kinds of animals. Conversely, the text label "German Shepherd" may be too specific, for example, if the image is actually an image of another kind of dog such as a Rottweiler. Overly broad and overly narrow labels often occur when there is little to no other context for the image, e.g., no labels or text associated with the image.

To select labels based on the labels output by the image annotator, a system consults a database of semantic relationships between text labels to determine text labels that are semantically related to the text labels determined according to the image relevance model. One or more text labels returned from the database that are semantically related to one or more of the originally returned text labels from the image annotator can be chosen to describe the original image.

One way to choose the labels returned from the database to describe the original image is to assign a label score to each of the labels returned from the database. A label score indicates the confidence that the label relates to a semantic theme of an image. Text labels having the highest label scores can be chosen to describe the original image. A label score can be based on a relevance score and a confidence score. For example, each of the originally returned text labels from the image annotator is returned with a relevance score that indicates the degree to which the text label is relevant to the original image. Further, the database of semantic relationships between text labels links the text labels with edges that have a confidence score that indicates a confidence that two text labels are semantically related to each other. If a first text label returned from the image annotator is linked to a second text label not returned from the image annotator, the relevance score of the first text label can be multiplied by the confidence score of the link between the first text label and the second text label to generate a label score for the second text label. If multiple labels returned from the image annotator are related to a particular text label in the database then the label score for that particular text label can be calculated by adding together multiple products of relevance scores and confidence scores.

Example Operating Environment

The following description uses the example of an image search system. However, the following techniques for choosing image labels could be used in a variety of systems other than an image search system. For example, the techniques could be used in a system for cataloguing and labeling images, such as an image database or image web site.

FIG. 1 is a block diagram of an example environment 100 in which a search system 110 provides search services. The example environment 100 includes a network 102, e.g., a local area network (LAN), wide area network (WAN), the Internet, or a combination of them, that connects web sites 104, user devices 106, and the search system 110. The environment 100 may include many web sites 104 and user devices 106 (which are also sometimes referred to as client devices).

A web site 104 is a facility containing one or more resources associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource is any data that can be provided by the web site 104 over the network 102 and that is associated with a resource address. Resources include HTML pages, word processing documents, and portable document format (PDF) documents, images, video, and feed sources, to name just a few. The resources can include content, e.g., words, phrases, images and sounds and may include embedded information, e.g., meta information and hyperlinks, and/or embedded instructions, e.g., scripts.

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources, the search system 110 identifies the resources by crawling and indexing the resources 105 provided by the web sites 104. Data about the resources can be indexed based on the resource to which the data corresponds.

The user devices 106 submit search queries 109 to the search system 110. In response, the search system 110 identifies resources that are responsive to, e.g., have at least a threshold relevance score for, the search query 109. The search system 110 generates search results 111 that identify the resources and returns the search results 111 to the user devices 106. A search result 111 is data generated by the search system 110 that identifies a resource that is responsive to a particular search query, and includes a link to the resource. An example search result 111 can include a web page title, a snippet of text or a portion of an image extracted from the web page, and the URL of the web page. For example, the search queries 109 can be submitted during user sessions in which a user of a user device 106 enters search queries into a user interface. During a user session, the user can be presented with search results 111.

Search results are ranked based on scores related to the resources identified by the search results, such as information retrieval ("IR") scores, and optionally a quality score of each resource relative to other resources. In some implementations, the IR scores are computed from dot products of feature vectors corresponding to a search query 109 and a resource, and the ranking of the search results is based on relevance scores that are a combination, e.g., sums, products, or other mathematical combinations, of the IR scores and quality scores. In some examples, the search results 111 can be ordered at least partially according to these relevance scores and provided to the user device according to the order.

The user devices 106 receive the search results, e.g., in the form of one or more web pages, and render the pages for presentation to users. In response to the user selecting a link in a search result at a user device 106, the user device 106 requests the resource identified by the link. The web site 104 hosting the resource receives the request for the resource 105 from the user device 106 and provides the resource to the requesting user device 106.

In some implementations, a search query 109 can include data for a single query type or for two or more query types (e.g., types of data in the query). For example, the search query 109 may have a text portion, and the search query may also have an image portion. A search query 109 that includes data for two or more query types can be referred to as a "hybrid query." In some examples, a search query 109 includes data for only one type of query. For example, the search query 109 may only include image query data (e.g., a query image), or the search query may only include textual query data (e.g., a text query).

Image Search Processing

In some implementations, the search system 110 includes an image search apparatus 120 that is used to process queries to identify images that are responsive to (e.g., semantically related) to the search query 109. For example, a query 109 may include text with which the search system 110 can perform an image search (e.g., a search for images that are responsive to the text).

The term "semantic relatedness" refers to the relatedness in meaning between two elements of information, for example, two portions of text, or a portion of text and an image. Two portions of text are semantically related if they describe related concepts. For example, the text "dog" and the text "German Shepherd" are semantically related because they both describe members of the canis lupus familiaris species. A portion of text and an image are semantically related if the text describes a topic of an image or otherwise has a relationship with the content of the image. Generally, text is semantically related to an image if the text is similar to or relevant to a topic of the image. For example, the text "dog" is semantically related to an image of a German Shepherd. The degree to which text is semantically related can be quantified. For example, a confidence score may be used to indicate the degree to which text is accurately related to an image.

An image label ("label") is data that is indicative of subject matter to which an image is relevant. Labels can be explicitly specified by a publisher of a web site 104 on which the image appears. Labels can also be generated, for example, based on text that appears near the image on the web page. For example, a label can be generated for an image based on text that is located adjacent to, e.g., within a threshold number of pixels of, the image or in a portion of a document that is identified as containing information relevant to the image, e.g., a frame in which the image is presented. A label can also be generated based on text that is included in the image, e.g., visually depicted in the image, or otherwise associated with the image, e.g., text included in a file name, text included in anchor text of a link to the image, or resource location of the image. The image label apparatus 126 can generate labels for images.

The queries submitted during the user sessions can be stored in query logs 114. Selection data defining actions taken responsive to search results provided for the user sessions can be stored in click logs 116. These actions can include whether a search result was selected, e.g., whether a user interacted with the search result. The query logs 114 and click logs 116 can be used to map queries submitted during user sessions to resources that were identified in search results and the actions taken by users. If time data are also stored, then the relative times at which those actions were taken can also be determined. The click logs and query logs can be used to map queries submitted during user sessions to resources that were identified in response to the queries and that were selected by the users of the user devices 106. In some implementations, the data stored in the query logs 114 and click logs 116 can be anonymized.

In some implementations, query data and image selection data (e.g., click data) are stored in the query logs 114 and click logs 116 for each unique query submitted by users. The query data are data that define queries of one or more words that were received, for example, as search queries 109. For example, if the queries "dolphin", "exhibits", and "dolphin exhibits" are each received by the search system 110, then query data and click data are stored in the query logs 114 and click logs 116 for each of the queries "dolphin", "exhibits", and "dolphin exhibits".

In some examples, the query logs 114 and click logs 116 can be used to generate image relevance models 112. For example, a corresponding image relevance model 112 can be generated (e.g., by the search system 110 or for the search system) for each query 109. When selecting images for reference in image search results responsive to a particular query, the image search apparatus 120 calculates the relevance measures based on an image relevance model 112 that is associated with that particular query.

Before the image relevance models 112 are used, they are generally trained by the image search apparatus 120. At a high level, the image search apparatus 120 can train an image relevance model 112 for each query by first selecting training images 118 that are relevant to that query and other images that are relevant to other queries. In some implementations, content feature values (i.e., values indicative of visual features of the image and/or other image features) for each image are extracted and are transformed into a sparse representation using a pre-computed dictionary of visual terms that represent a set of regions having similar content feature values. The extraction and transformation yields a "bag of features" for the image. Generally, the content feature values of an image quantitatively represent visual features of the image.

Thereafter, an image relevance model 112 for each query is learned. The image relevance model 112 is of the form that generates a score for an image based on the sparse representation of the image, e.g., $$IRS=W*X$$

where IRS is an image relevance score, X is a sparse vector of content feature values representing an image, and W is a vector of parameters, e.g., feature weights, learned for the model.

The technique described here only represents some implementations for determining content feature values. Other implementations can use other techniques to determine content feature values. For examples, some implementations can use a non-linear model for associating content feature values and feature weights.

To select training images 118, the image search apparatus 120 identifies images as being relevant to a query based on a relevance measure between the image and the query. In some implementations, the relevance measure is based on a relevance feedback score. The relevance feedback score is a relevance measure that is generated based on user actions in response to an image appearing in search results. For example, click data specifying a number of times an image was selected from search results for a query can represent a measure of the relevance of the image to the query. Thus, the image search apparatus 120 can derive the relevance measure, based at least in part on, the click logs 116 and query logs 114, e.g., based on numbers of times that images were presented in response to particular queries and numbers of times that users interacted with the images when presented.

Each image relevance model 112 is trained to determine the relevance of an image to a query, e.g., one of the queries 109, based on content feature values of images for which a relevance feedback score is available. In turn, the image relevance model can be applied to content feature values of other images to determine a relevance score for the other images relative to the query. For example, the content feature values can be input to the image relevance model, which can compute and output the relevance score.

The image search apparatus 120 applies an independent image relevance model 112 to content feature values of the images for each unique query, e.g., unique set of terms submitted as a query, that is identified by the image search apparatus 120. Using a separate image relevance model 112 for each query rather than using an image relevance model for each constituent term in the query reduces the overhead associated with identifying search results for a query. For example, the image relevance models 112 for the queries can be trained independently and in parallel, as they are not required to consider the output of other image relevance models 112 for other queries. Additionally, only one image relevance model 112 need be processed for each query, which reduces resources when selecting images to reference in image search results for a query.

In some examples, a image relevance model 112 can be trained based on data other than click logs 116 and query logs 114. For example, other data that correlates text to images could be used. Although image relevance models 112 are described here as corresponding to a query, an image relevance model 112 could correspond to any word or phrase representing a concept. We use the term "query" to refer to any such word or phrase, whether or not the word or phrase originated as a search query, e.g., in query logs 114.

In some implementations, a search query 109 can contain an image, sometimes called a query image 113. For example, the search system 110 can return results responsive to the query image 113 contained in the search query 109. In some examples, the search system 110 can determine which labels are semantically related to the query image 113. The labels can then be used to identify search results 111 responsive to the query image 113, for example, by using the labels as textual search queries. The search system 110 can determine which labels are semantically related to the query image 113 by providing the query image 113 to the image label apparatus 126.

Image Labeling

The image label apparatus 126 generates labels (e.g., textual data) indicative of a topic or subject matter to which images are related, or are otherwise semantically related to images. The labels returned by the image label apparatus 126 can be used as annotations or descriptions for the input image. The image label apparatus 126 can receive an image as input and the image label apparatus 126 can return one or more labels that describe a topic of or are otherwise semantically related to the image. In some implementations, the image label apparatus 126 can identify a label that is semantically related to an image because the image label apparatus 126 already stores data describing the image, including data indicating which labels are semantically related to the image. In some implementations, the image label apparatus 126 can consult an image relevance model 112 to identify a label based on visual features of the image. For example, the image label apparatus 126 can provide the image to an image relevance model 112 for a particular query to determine the degree to which the image is relevant to the query. The query can then be used as a label for the image, for example, if the query is determined to be relevant to the image.

The image label apparatus 126 and related processes are described with reference to search queries 109 and search results 111 that have been identified as responsive to a search query. However, each respective apparatus and process can be implemented with different processing systems and for different operational environments. Further, the image label apparatus 126 could be used with systems other than image search systems; this is just one example application.

When an image relevance model 112 receives an image as input, the image relevance model 112 can output a relevance score indicating the degree to which the input image is related to the text (e.g., a query) represented by the image relevance model 112. The reliability of the relevance score as an indication of image relevance to a particular query is generally dependent on the accuracy of relevance feedback as a relevance indicator.

In some implementations, the labels identified by the image label apparatus 126 for an input image (e.g., a query image 113) are not distinguished based on their specificity. Thus, the image label apparatus 126 may return labels that are all semantically related to the input image but are more general or more specific than each other. For example, for an image of a dog, the image label apparatus 126 may return "dog," "black dog," "black and brown dog," "large dog," "animal," "German Shepherd," and "Rottweiler," all for the same image, and each label may have a relevance score.

As described above, labels may be too specific or too broad. However, the relevance scores of the labels may not be reflective of the specificity of the label. The label "German Shepherd" may be too specific, for example, if the image is actually an image of another kind of dog such as a Rottweiler. This could occur because the visual features of an image of a German Shepherd are likely to be similar to the visual features of images of a Rottweiler, for example, because the images will share similar shapes and colors. As a result, the label "German Shepherd" may have a relevance score as high or nearly as high as the more accurate label "Rottweiler." The label "German Shepherd" may also have a relevance score as high or nearly as high as the less precise (more general) and more accurate label "black and brown dog." Further, a less precise and more accurate label such as "black and brown dog" may not be among the labels returned by the image label apparatus 126, which indicates the label had a very low relevance score relative to other labels. Thus, the relevance scores may not be a reliable indicator of which label or labels most accurately describe the input image.

In some implementations, the search system 110 refines the labels associated with an image by consulting a semantic database 140. A semantic database 140 stores labels and makes associations between the labels based on the degree of semantic relatedness between the labels. The search system 110 can consult the associations in the semantic database 140 to identify other labels that are semantically related to the labels returned by the image label apparatus 126. The associations between the labels in the semantic database 140 can be used to refine the collection of labels used to annotate an image.

Figure 2:
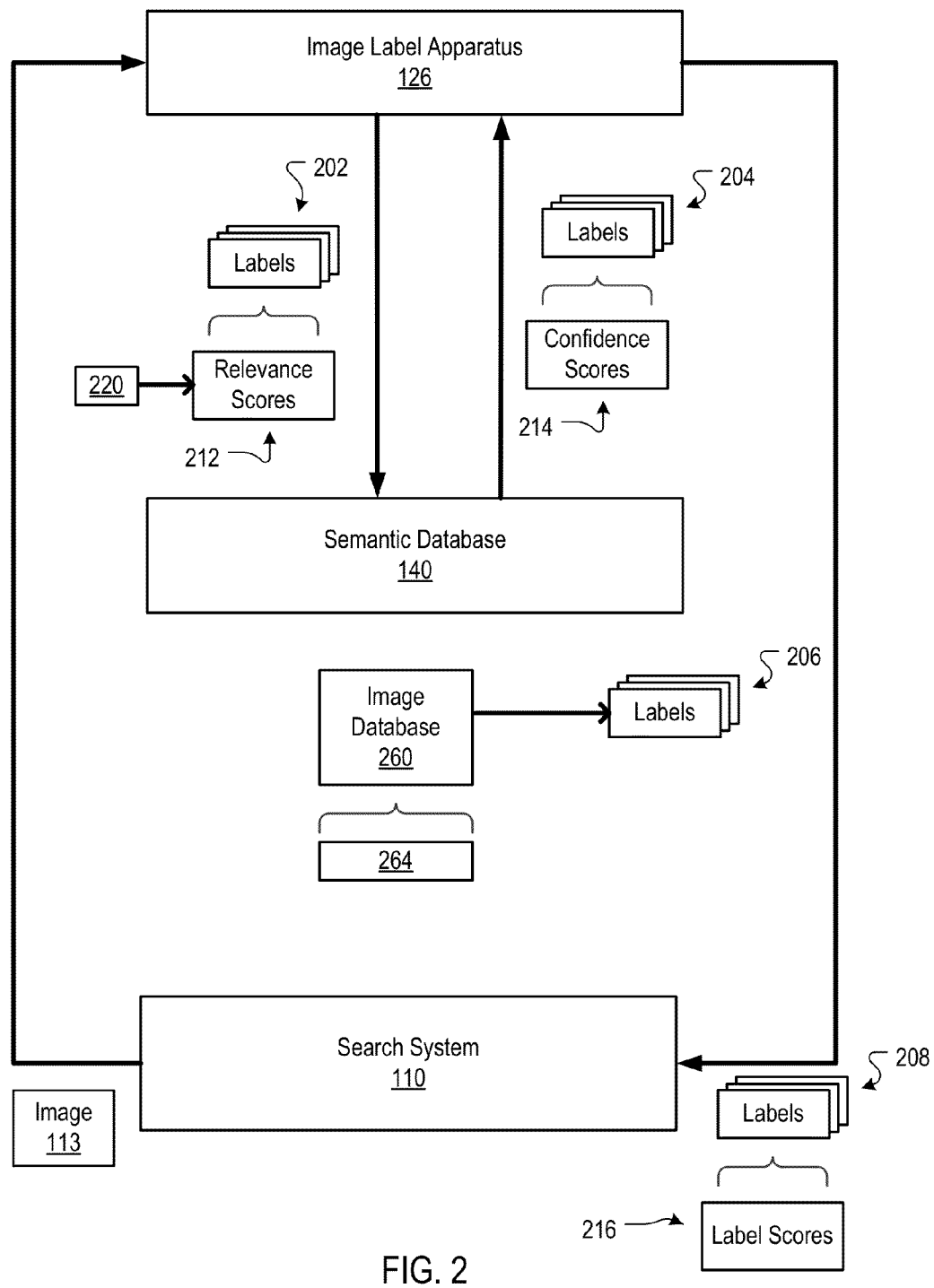
FIG. 2 is a block diagram illustrating assignment of labels to an image.

FIG. 2 is a block diagram illustrating assignment of labels to an image. The labels are labels determined to be semantically related to the image. As shown in FIG. 2, the search system 110 interacts with related components to choose labels. In some implementations, components other than the components shown here can undertake the same or similar operations to choose labels.

The search system 110 provides an image 113 to the image label apparatus 126. The image 113 is provided to the image label apparatus to obtain one or more labels that are semantically related to the image 113. The image 113 may be a query image submitted as part of a search query 109, as shown in FIG. 1. Alternatively, the image 113 could be another kind of image, for example, an image stored in a database of images. In some examples, this process could be used to assign labels to one or more images stored in a database of images.

The image label apparatus 126 generates a set of labels 202 determined to be semantically related to the image 113. In some implementations, the image label apparatus 126 consults image relevance models 112 as shown in FIG. 1 to determine the degree to which the image 113 is relevant, e.g., semantically related, to one or more queries represented by respective image relevance models. If one or more queries are determined to be relevant to an image 113, the queries can be used as labels for the image 113. The degree to which the image 113 is semantically related to each label is represented as relevance scores 212. Each label in the set of labels 202 is paired with one of the relevance scores 212. In some implementations, a threshold relevance score 220 is used to determine which labels will be returned in the set of labels 202. For example, each label having a relevance score greater than the threshold relevance score 220 can be included in the set of labels 202. The set of labels 202 are then provided to the semantic database 140 as a set of database queries to the data stored by the semantic database 140. In some implementations, multiple threshold relevance scores 220 can be used. For example, labels could be categorized according to one or more criteria (e.g., number of words or characters in a label, language of origin of the label, etc.), and different threshold relevance scores 220 could be used for different criteria.

Figure 3:
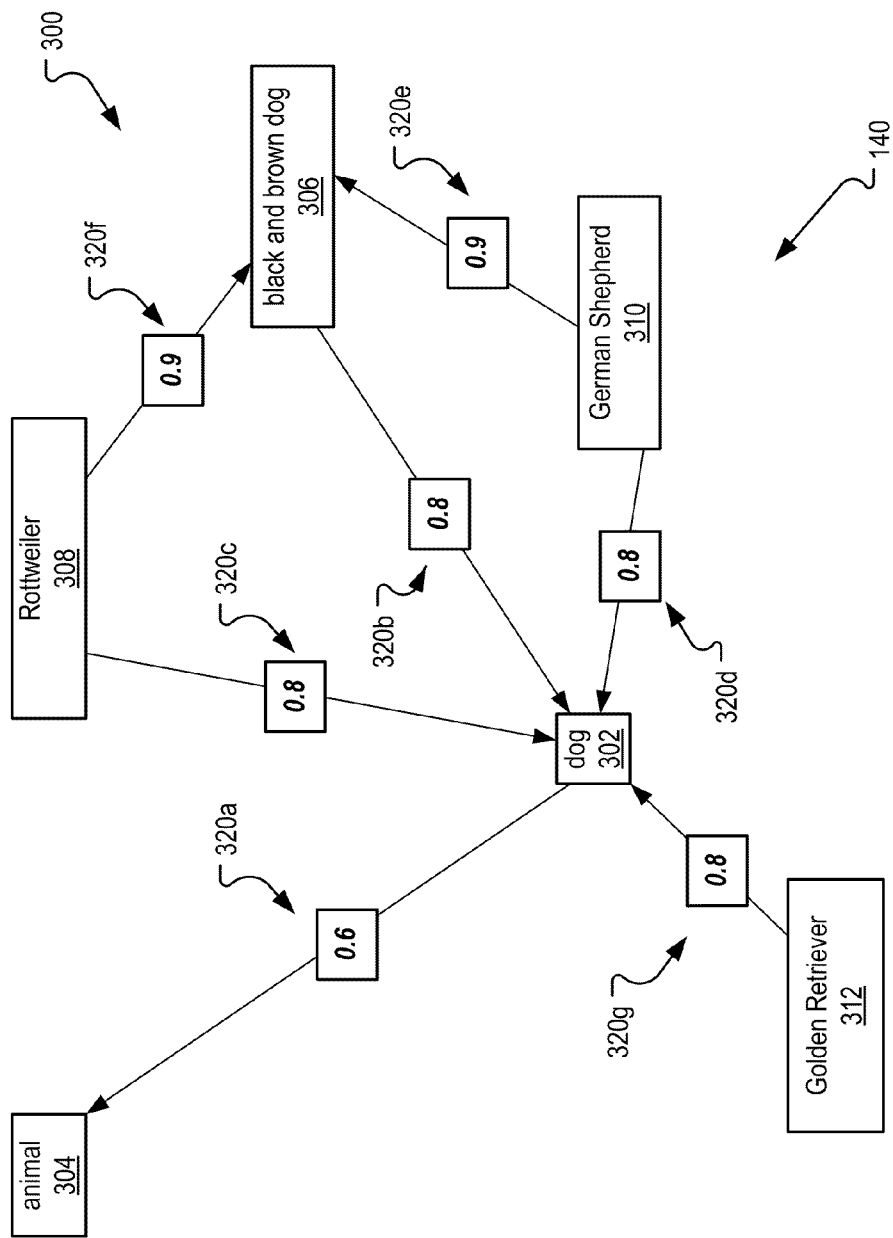
FIG. 3 is an example representation of a portion of a semantic database.

The semantic database 140 returns a second set of labels 204, each determined to be semantically related to one of the labels in the set of labels 202. The second set of labels 204 is associated with confidence scores 214. For example, each of the labels in the second set of labels 204 can have an associated confidence score which indicates the confidence that the label in the second set of labels is semantically related to the corresponding label in the first set of labels 202. Examples of the confidence scores are shown in FIG. 3.

Depending on the contents of the semantic database 140, some of the labels in the second set of labels 204 may be labels also found in the first set of labels 202, and some of the labels in the second set of labels 204 may be labels not found in the first set of labels 202. Because a label in the semantic database 140 may be linked to more than one label in the first set of labels, a label can appear more than once in the second set of labels 204. A label that appears more than once in the second set of labels 204 may be more relevant to an image than a label appearing only once, since a label appearing more than once in the second set of labels 204 is semantically related to more than one label originally returned by the image label apparatus 126 as describing the image. Each of the confidence scores 214 is associated with a relationship between two labels, such as a label in the first set of labels 202 and a label in the second set of labels 204.

The image label apparatus 126 then combines the first set of labels 202 and the second set of labels 204 to generate a combined set of labels 206. The image label apparatus 126 assigns labels scores 216 to the combined set of labels 206. A label score is determined based on a relevance score and a confidence score. If a label appearing in the second set of labels 204 does not appear in the first set of labels 202, then the label score for the label in the second set of labels 204 can be determined based on a relevance score of a label in the first set of labels, and a confidence score of the relationship between the label in the second set of labels 204 and the label in the first set of labels 202. For example, the confidence score of the relationship between the label in the second set of labels 204 and the label in the first set of labels 202 can be multiplied by the relevance score of the label in the first set of labels 202 to generate a label score for the label in the second set of labels 204. Further, labels appearing in the first set of labels 202 can be carried over to the combined set of labels 206 with their original relevance scores 212. Because labels may appear more than once among the first set of labels 202 and the second set of labels 204, the multiple label scores for a label appearing multiple times can be summed together to generate a single label score for that label. For this reason, a label appearing multiple times among the first set of labels 202 and the second set of labels 204 will tend to have a higher label score than labels appearing once.

In some implementations, the combined set of labels 206 can be modified based on popularity scores associated with the labels. For example, a database of images 260 may include labels assigned to images by users. The database of images 260 could be part of a web site that stores images provided by users and also makes available the images for display. Further, the users may "tag" images with the labels, e.g., using a web interface. If a label in the combined set of labels 206 is infrequently used by users to tag images in the database of images 260, then the infrequently used label could be removed from the combined set of labels 206. In some examples, a popularity score 264 associated with each label can be used to determine the popularity of a particular label. In some implementations, the label scores 216 can be modified by the popularity scores 264. For example, a label score for a label could be increased or decreased based on a popularity score corresponding to the label. A popularity score could be determined in other ways. In some examples, a popularity score could be determined by a frequency at which a label is used as a query in image searches, or a popularity score could be determined by a frequency at which a label is found in a corpus of text, or other kinds of popularity scores could be used.

The combined set of labels 206 can then be used to facilitate various operations related to the image. For example, the combined set of labels 206 are then provided to the search system 110. Labels in the combined set of labels 206 can be used by the search system 110 to describe the original image 113. In some examples, labels in the combined set of labels 206 having label scores 216 greater than a label score threshold are used to describe the image 113. If only one label is needed by the search system 110, the search system 110 could use the label in the combined set of labels 206 having the highest label score.

Figure 4:
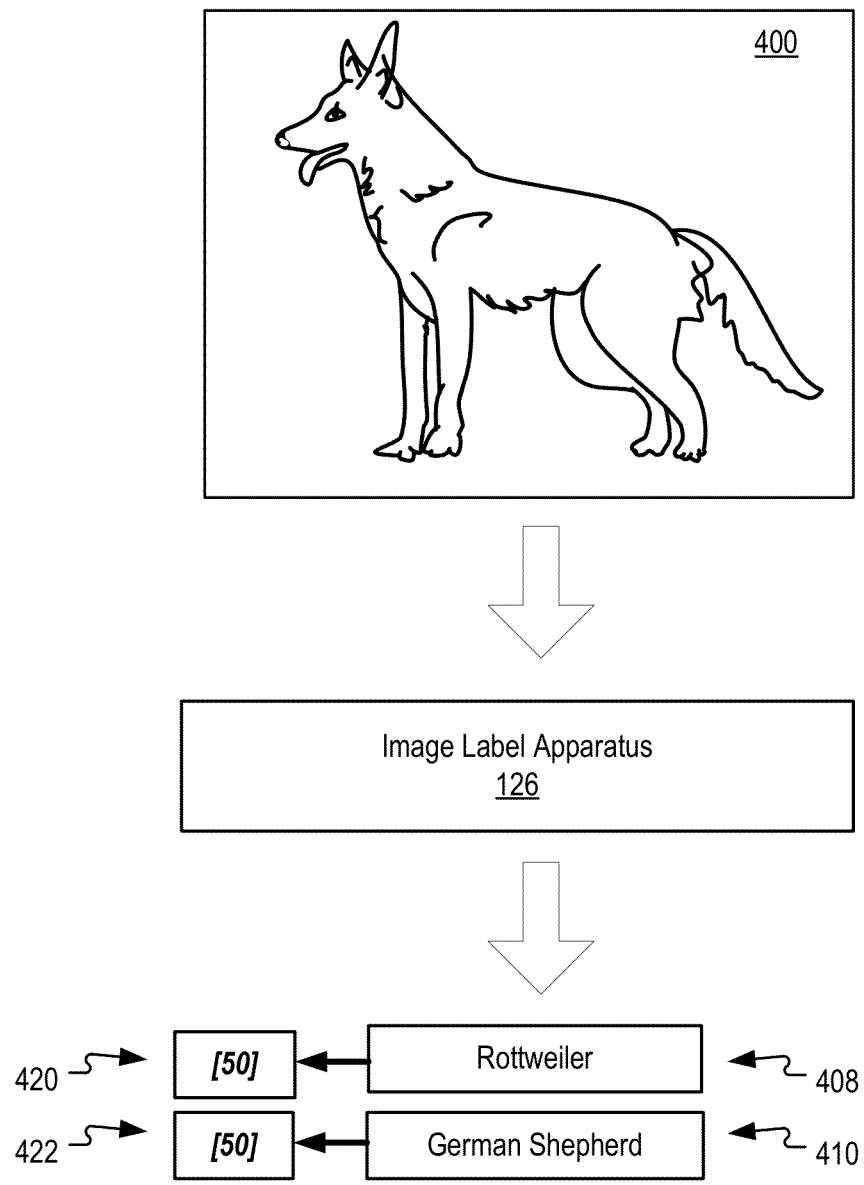
FIG. 4 is a block diagram showing an example data flow for generating labels for an image using an image label apparatus.

FIGS. 3, 4, and 5 show this process in greater detail, including examples of the contents of the sets of labels and their associated scores.

FIG. 3 is an example representation of a portion of a semantic database 140. The semantic database 140 is represented as a graph 300 of nodes connected by weighted edges. The data represented by the nodes are labels 302, 304, 306, 308, 310, 312 stored in the semantic database 140. Each of the labels 302, 304, 306, 308, 310, 312 is connected to at least one other label by a confidence score 320a-g indicating a confidence that the connected labels are semantically related to each other. A confidence score 320a-g of 1 indicates 100% certainty that the connected labels are semantically related to each other. For example, one label 302, "dog," is connected to another label 304, "animal," by a confidence score 320a of [0.6]. This indicates a 60% confidence that the two labels 302, 304 are semantically related. In some examples, the connections between the labels 302, 304, 306, 308, 310, 312 can be directional. For example, the label 302, "dog" can be connected to the label 304, "animal" by a directional edge that indicates that "dog" is a subcategory of "animal."

FIG. 4 is a block diagram showing an example data flow for generating labels 408, 410 for an image 400 using an image label apparatus. An image 400 is provided to an image label apparatus 126 as an input. The image label apparatus 126 then returns labels 408, 410 determined to be semantically related to the image 400. In some implementations, the labels 408, 410 are determined based on image relevance models 112 (FIG. 1). For example, the labels 408, 410 can be labels each having a respective relevance score 420, 422 above a relevance score threshold.

In this example, the labels 408, 410 are an example of the first set of labels 202 shown in FIG. 2, and the relevance scores 420, 422 are an example of the relevance scores 212 shown in FIG. 2. Here, the two labels 408, 410 happen to have relevance scores 420, 422 having the same value, which is

[50]. Further, the labels 408, 410 are "Rottweiler" and "German Shepherd," which both describe dogs having similar shape and color. However, if the image 400 represents a picture of a Rottweiler, then the "German Shepherd" label will be semantically inaccurate, and vice-versa. Thus, the semantic database 140 can be used to better refine the labels returned by the image label apparatus 126.

FIGS. 5A-5C are block diagrams together showing an example data flow for generating label scores. Continuing with the example shown in FIG. 4, each of the labels 408, 410 can be provided to the semantic database 140 as inputs. The semantic database 140 returns labels 302, 306 identified as semantically related to the input labels 408, 410. These labels 302, 306 are examples of labels that appear in a second set of labels 204 as shown in FIG. 2.

Data returned by the semantic database 140 can identify the relationships between the labels and confidence scores for those relationships. For example, referring to FIG. 3, the label 408 "Rottweiler" also appears in the semantic database 140 as a label 308. That label 308 is connected to one label 302, "dog," with a confidence score 302c of [0.8], and the label 308 is also connected to another label 306, "black and brown dog," with a confidence score 302f of [0.9]. Thus, as shown in FIG. 5A, the two labels 302, 306 appear in the list of labels returned for the original input label 408. The confidence scores 302c, 302f of those connections are multiplied by the relevance score 420 of the original input label 408 to generate label scores 502, 504 for each of the returned labels 302, 306.

As shown in FIG. 5B, label 410 "German Shepherd" also has a returned list of labels 302, 306 and corresponding label scores 506, 508. It happens that in the example shown here, the labels 302, 306 returned for each of the input labels 408, 410 are the same labels, but in some examples, one or more labels returned for one input label are not returned for another input label. Labels 408, 410 that are determined to be semantically related to an image tend to have similar semantic meaning in relation to each other, so it is not unusual for the labels 408, 410 to be semantically related to the same labels 302, 306 in the semantic database 140.

As shown in FIG. 5C, the final list of labels 550 can be generated by combining the set of the original labels 408, 410 returned from the image label apparatus 124 (FIG. 4) with the sets of the labels 302, 306 returned from the semantic database 140. The final list of labels 550 is an example of the combined list of labels 206 shown in FIG. 2 and can be assigned to the original image 400 (FIG. 4), e.g., to obtain search results for the image 400, or assigned to the original image 400 in a database of labels assigned to images. When a label appears more than once, the label scores or relevance scores can, for example, be added together to calculate a final combined label score. Other functions can be used to calculate the final combined label score. As an example of determining label scores, the label 302 "dog" and the label 306 "black and brown dog" appear in the labels returned for both of the original input labels 408, 410. Thus, the label scores 504, 508 for "dog" and the label scores 502, 506 for "black and brown dog" can be combined to generate a final label score 516 of [80] for "dog" and a final label score 514 of [90] for "black and brown dog." Further, the original labels 408, 410 are included in the final set of labels 550 with label scores 510, 512 having the same value as their original respective relevance scores 420, 422. In this example, the label 306 "black and brown dog" has the highest label score 514, and could be chosen as a label that best describes the original image 400 (FIG. 4).

In some implementations, labels having a label score below a label score threshold 520, e.g., a threshold value of [50], can be removed from the final list of labels 550. The threshold 520 could also be a number of labels, for example, such that a threshold number of highest scoring labels can be retained, and the other labels removed. This method is sometimes known as retaining only the top k number of labels, where k is a constant chosen as a threshold.

In some implementations, an image relevance model 112 (FIG. 1) exists for the labels 302, 306 which were not among the labels identified by the image label apparatus 124 (FIG. 4). In some examples, the original image 400 (FIG. 4) can be provided to the image relevance models 112 corresponding to each of the respective labels 302, 306 to verify that the labels 302, 306 are semantically related to the original image 400. For example, if a relevance score for any of the labels 302, 306 does not meet a threshold relevance score, e.g., the threshold relevance score 220 shown in FIG. 2, then the labels not meeting the threshold relevance score can be removed from the final list of labels 550. In some examples, other verification steps could be used. For example, the labels 302, 306 could be used by the search system 110 as search queries 109 (FIG. 1), and a determination could be made if the original image 400 appears in image search results 109. If the original image 400 does not appear in the search results 109, then the corresponding label can be removed from the final list of labels 550.

Example Process Flow

Figure 6:
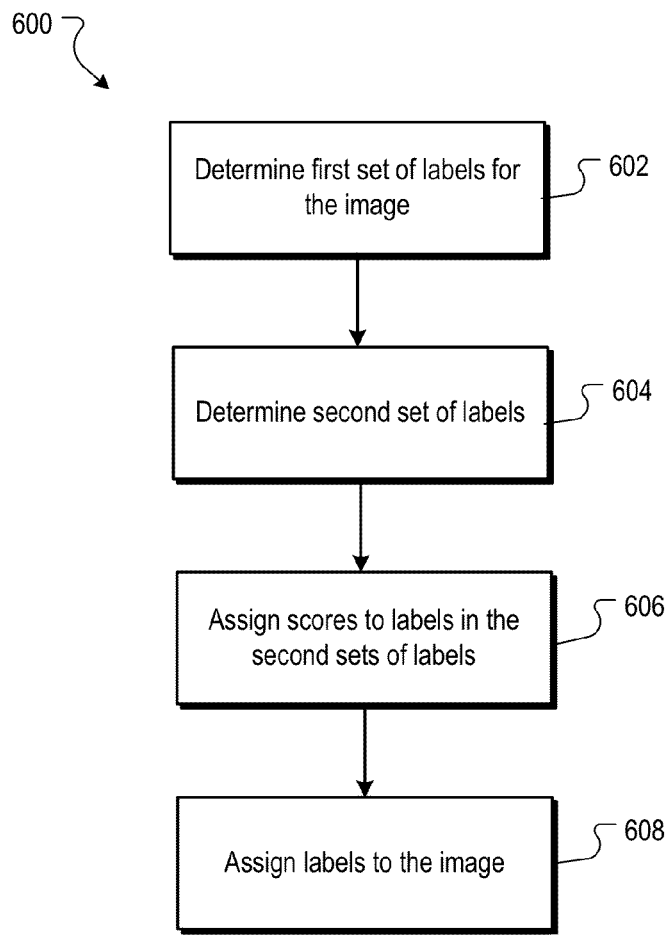
FIG. 6 is a flowchart of an example process for assigning labels to images.

FIG. 6 is a flowchart of an example process 600 for is a flowchart of an example process for assigning labels to images. The operations of the process 600 can be performed, for example, by a search system 110.

In some implementations, an image is optionally provided to one or more image relevance models. For example, the image relevance models may generate relevance measures of content feature values of images to a respective query. The image relevance models may have been trained based on content feature values of a set of training images, such that the queries are each a unique set of one or more query terms received by a search system as a query input.

At operation 602, a set of labels is determined. In some examples, the set of labels is received, e.g., from an image label apparatus. In some examples, the set of labels is determined by a technique other than receiving them from an image label apparatus. Each label in the set of labels is determined to be indicative of subject matter of an image based on content feature values of the image. In some examples, each of the labels is associated with a relevance score indicating a degree to which the label in the first set of labels is semantically related to the image. The set of labels corresponding to the image can be determined based on the relevance measures generated by the image relevance models for the queries.

At operation 604, a second set of labels is determined for each label in the first set of labels. Each label in the second set of labels is determined to be semantically related to the label in the first set of labels. In some examples, the labels in the second set of labels can be received from a semantic database. For example, the semantic database can include a graph of semantic relationships between labels. Labels in the semantic database can be connected according to confidence scores indicating a confidence that a label in one of the second sets of labels is semantically related to a label in the set of labels.

At operation 606, a score is assigned to each label in the second sets of labels. For example, a label score could be used. A label score can be a relevance score of a label returned from an image label apparatus, or the label score can be a product of a relevance score and a confidence score returned from a semantic database, or a label score can be a summation of multiple label scores associated with a label.

In some implementations, a determination is optionally made that each label in the second sets of labels meets an image relevance score threshold. In some implementations, the image corresponding to the first set of labels is provided to an image relevance model corresponding to a label in the second set of labels. An image relevance score is then received from the image relevance model. If the image relevance score meets an image relevance score threshold, the label can be retained in the second set of labels. If the image relevance score does not meet an image relevance score threshold, the label can be removed from the second set of labels. This operation can be performed for each label in the second sets of labels.

At operation 608, one or more of the labels in the second sets of labels is assigned to the image corresponding to the first set of labels. The assignment can be made based on the scores assigned to each label in the second sets of labels. In some examples, labels in the second sets of labels are assigned to the image if they have a label score meeting a label score threshold. In some examples, a threshold number of labels in the second sets of labels having scores higher than the other labels in the second sets of labels is assigned to the image.

Additional Implementation Details

FIG. 7 is a block diagram of an example computer system 700. For example, the system 700 could be a system or a portion of a system executing the search system 110 or other systems shown in FIG. 1. The system 700 includes a processor 710, a memory 720, a storage device 730, and an input/output device 740. Each of the components 710, 720, 730, and 740 can be interconnected, for example, using a system bus 750. The processor 710 is capable of processing instructions for execution within the system 700. In one implementation, the processor 710 is a single-threaded processor. In another implementation, the processor 710 is a multi-threaded processor. The processor 710 is capable of processing instructions stored in the memory 720 or on the storage device 730.

The memory 720 stores information within the system 700. In one implementation, the memory 720 is a computer-readable medium. In one implementation, the memory 720 is a volatile memory unit. In another implementation, the memory 720 is a non-volatile memory unit.

The storage device 730 is capable of providing mass storage for the system 700. In one implementation, the storage device 730 is a computer-readable medium. In various different implementations, the storage device 730 can include, for example, a hard disk device, an optical disk device, or some other large capacity storage device.

The input/output device 740 provides input/output operations for the system 700. In one implementation, the input/output device 740 can include one or more of a network interface devices, e.g., an Ethernet card, a serial communication device, e.g., an RS-232 port, and/or a wireless interface device, e.g., and 802.11 card. In another implementation, the input/output device can include driver devices configured to receive input data and send output data to other input/output devices, e.g., keyboard, printer and display devices 760. Other implementations, however, can also be used, such as mobile computing devices, mobile communication devices, set-top box television client devices, etc.

Implementations of the subject matter and the operations described in this specification can be implemented in digital electronic circuitry, or in computer software, firmware, or hardware, including the structures disclosed in this specification and their structural equivalents, or in combinations of one or more of them. Implementations of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Implementations of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some implementations, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of what may be claimed, but rather as descriptions of features specific to particular implementations. Certain features that are described in this specification in the context of separate implementations can also be implemented in combination in a single implementation. Conversely, various features that are described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

Thus, particular implementations have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A method implemented by one or more processing devices, comprising:
   determining, for an image, a first set of labels, each label being determined to be indicative of subject matter of the image based on content feature values of the image;
   for each label in the first set of labels:
      querying, using the label in the first set of labels as a query, an association of labels that are associated with each other based on a degree of semantic relatedness;
      determining a second set of labels that are responsive to the label in the first set of labels, each label in the second set of labels determined to be semantically related to the label in the first set of labels based on a degree of semantic relatedness and having a confidence score, wherein:
         the confidence score indicates a confidence that the label in the second set of labels is semantically related to the label in the first set of labels; and
         the confidence score is independent of the label in the second set of labels and the label in the first set of labels being returned for a same image;
      assigning a score to each label in the second sets of labels based on the confidence score of the respective label in the second set of labels; and based on the scores assigned to each label in the second sets of labels, assigning one or more of the labels in the second sets of labels to the image.

2. The method of claim 1, wherein assigning one or more of the labels in the second sets of labels to the image comprises assigning labels in the second sets of labels having a score meeting a score threshold to the image.

3. The method of claim 1, wherein assigning a score to each label in the second sets of labels comprises:
receiving a relevance score indicating a degree to which a label in the first set of labels is semantically related to the image; and
assigning the score to the respective label based on the relevance score.

4. The method of claim 1, wherein assigning a score to each label in the second sets of labels received for each label in the set of labels comprises:
receiving a popularity score indicating a popularity of the respective label in the second sets of labels when the respective label in the second sets of labels is used by users to tag images in a database of images.

5. The method of claim 1, wherein determining the first set of labels comprises:
providing the image to image relevance models that each generate relevance measures for content feature values of images to a respective queries, each of the image relevance models trained for a respective query based on content feature values of a set of training images, each respective query being a unique set of one or more query terms received by a search system as a query input; and
determine the first set of labels based on the relevance measures generated by the image relevance models for the image.

6. The method of claim 1, wherein each label in the second set of labels is determined to be semantically related to the label in the first set of labels based on a graph of semantic relationships between labels.

7. The method of claim 1, wherein assigning one or more of the labels in the second sets of labels to the image comprises assigning a threshold number of labels in the second sets of labels having scores higher than other labels in the second sets of labels.

8. A system, comprising:
a data processing apparatus; and
a memory coupled to the data processing apparatus having instructions stored thereon which, when executed by the data processing apparatus cause the data processing apparatus to perform operations comprising:
determining, for an image, a first set of labels, each label being determined to be indicative of subject matter of the image based on content feature values of the image;
for each label in the first set of labels:
querying, using the label in the first set of labels as a query, an association of labels that are associated with each other based on a degree of semantic relatedness;
determining a second set of labels that are responsive to the label in the first set of labels, each label in the second set of labels determined to be semantically related to the label in the first set of labels based on a degree of semantic relatedness and having a confidence score, wherein:
the confidence score indicates a confidence that the label in the second set of labels is semantically related to the label in the first set of labels; and
the confidence score is independent of the label in the second set of labels and the label in the first set of labels being returned for a same image;
assigning a score to each label in the second sets of labels based on the confidence score of the respective label in the second set of labels; and
based on the scores assigned to each label in the second sets of labels, assigning one or more of the labels in the second sets of labels to the image.

9. The system of claim 8, wherein assigning one or more of the labels in the second sets of labels to the image comprises assigning labels in the second sets of labels having a score meeting a score threshold to the image.

10. The system of claim 8, wherein assigning a score to each label in the second sets of labels comprises:
receiving a relevance score indicating a degree to which a label in the first set of labels is semantically related to the image; and
assigning the score to the respective label based on the relevance score.

11. The system of claim 8, wherein assigning a score to each label in the second sets of labels received for each label in the set of labels comprises:
receiving a popularity score indicating a popularity of the respective label in the second sets of labels when the respective label in the second sets of labels is used by users to tag images in a database of images.

12. The system of claim 8, wherein determining the first set of labels comprises:
providing the image to image relevance models that each generate relevance measures for content feature values of images to a respective queries, each of the image relevance models trained for a respective query based on content feature values of a set of training images, each respective query being a unique set of one or more query terms received by a search system as a query input; and
determine the first set of labels based on the relevance measures generated by the image relevance models for the image.

13. The system of claim 8, wherein each label in the second set of labels is determined to be semantically related to the label in the first set of labels based on a graph of semantic relationships between labels.

14. The system of claim 8, wherein assigning one or more of the labels in the second sets of labels to the image comprises assigning a threshold number of labels in the second sets of labels having scores higher than other labels in the second sets of labels.

15. A non-transitory computer readable media storing software comprising instructions executable by a processing device and upon such execution cause the processing device to perform operations comprising:
determining, for an image, a first set of labels, each label being determined to be indicative of subject matter of the image based on content feature values of the image;
for each label in the first set of labels:
querying, using the label in the first set of labels as a query, an association of labels that are associated with each other based on a degree of semantic relatedness;
determining a second set of labels that are responsive to the label in the first set of labels, each label in the second set of labels determined to be semantically related to the label in the first set of labels based on a degree of semantic relatedness and having a confidence score, wherein:
the confidence score indicates a confidence that the label in the second set of labels is semantically related to the label in the first set of labels; and the confidence score is independent of the label in the second set of labels and the label in the first set of labels being returned for a same image;

assigning a score to each label in the second sets of labels based on the confidence score of the respective label in the second set of labels; and based on the scores assigned to each label in the second sets of labels, assigning one or more of the labels in the second sets of labels to the image.

16. The non-transitory computer readable media of claim 15, wherein determining the first set of labels comprises:

providing the image to image relevance models that each generate relevance measures for content feature values of images to a respective queries, each of the image relevance models trained for a respective query based on content feature values of a set of training images, each respective query being a unique set of one or more query terms received by a search system as a query input; and determine the first set of labels based on the relevance measures generated by the image relevance models for the image.

\* \* \* \* \*